US012786927B2

(12) United States Patent
Chen

(10) Patent No.: US 12,786,927 B2
(45) Date of Patent: Nov. 3, 2026

(54) TRACKING AREA ABNORMALITY PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Dong Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 305 days.

(21) Appl. No.: 18/580,033

(22) PCT Filed: Jul. 20, 2021

(86) PCT No.: PCT/CN2021/107241

§ 371 (c)(1),
(2) Date: Jan. 17, 2024

(87) PCT Pub. No.: WO2023/000154

PCT Pub. Date: Jan. 26, 2023

(65) Prior Publication Data

US 2024/0340835 A1 Oct. 10, 2024

(51) Int. Cl.
*H04W 60/04* (2009.01)
*H04W 48/02* (2009.01)
*H04W 76/20* (2018.01)

(52) U.S. Cl.
CPC ........... *H04W 60/04* (2013.01); *H04W 48/02* (2013.01); *H04W 76/20* (2018.02)

(58) Field of Classification Search
CPC ..... H04W 48/02; H04W 36/00; H04W 60/00; H04W 60/04; H04W 64/00; H04W 76/20; H04W 60/001; H04W 60/002
See application file for complete search history.

(56) References Cited

U.S. PATENT DOCUMENTS

2019/0289571 A1 9/2019 Park et al.
2020/0404734 A1* 12/2020 Watfa .................... H04W 48/18
2021/0037496 A1 2/2021 Ryu et al.
(Continued)

FOREIGN PATENT DOCUMENTS

CN 101754357 A 6/2010
CN 111586772 A 8/2020
CN 113094479 A 7/2021
(Continued)

OTHER PUBLICATIONS

Qualcomm Incorporated ("Discussion of Mobility Registration Update to support NR Satellite Access", SA WG2 Meeting #144e, S2-2102433, Apr. 12-16, 2021) (Year: 2021).*
(Continued)

*Primary Examiner* — Ji-Hae Yea
(74) *Attorney, Agent, or Firm* — Volpe Koenig

(57) ABSTRACT

A TA abnormality processing method includes: receiving a Non-Access Stratum (NAS) request message. Then determining subsequent processing according to TA abnormality processing decision information, in response to determining, according to the NAS request message, that a TA abnormality that a TA where a User Equipment (UE) is currently located is outside a Registration Area (RA) of the UE occurs.

16 Claims, 7 Drawing Sheets

(56) References Cited

U.S. PATENT DOCUMENTS

2021/0051444 A1 2/2021 Ryu et al.

FOREIGN PATENT DOCUMENTS

| | | | | |
|---|---|---|---|---|
| JP | 2013153267 A | 8/2013 | | |
| WO | 2018/205145 A1 | 11/2018 | | |
| WO | 2019182430 A1 | 9/2019 | | |
| WO | WO-2020168753 A1 * | 8/2020 | ........ | H04W 36/0011 |

OTHER PUBLICATIONS

WO2020168753A1-English Translated (Year: 2025).*
Qualcomm Incorporated. Discussion of Mobility Registration Update to Support NR Satellite Access SA WG2 Meeting # 144e S2-2102433, (Apr. 6, 2021).
3GPP TS 23.501, V17.1.0 (Jun. 2021).
3GPP TS 23.502, V17.1.0 (Jun. 2021).
3GPP TR 28.809 V1.3.0, 3rd Generation Partnership Project; Technical Specification Group Services and System Aspects; Management and orchestration; Study on enhancement of Management Data Analytics (MDA) (Release 17) (2021).
Interdigital, Inc., "UL time/frequency synchronization for NTN", 3GPP TSG RAN WG1 #105-e, R1-2105668,e-Meeting, May 10-27, 2021.

* cited by examiner

TRACKING AREA ABNORMALITY PROCESSING METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2021/107241, filed on Jul. 20, 2021, the contents of all of which are incorporated herein by reference in their entireties for all purposes.

TECHNICAL FIELD

The present disclosure relates to, but is not limited to, the technical field of radio communication, in particular to a tracking area (TA) abnormality processing method and apparatus, a communication device, and a storage medium.

BACKGROUND

User equipment (UE) sends a registration request to a network while initially connected to a network, and the network side then responds to the registration request. During the registration process, the network side generates and records a registration area (RA) of the UE, and the RA usually contains one or more TAs. In some cases, the network side records the RA of the UE in the form of a TA list (TAL).

SUMMARY

Embodiments of the present disclosure disclose a TA abnormality processing method and apparatus, an information processing method and apparatus, a communication device, and a storage medium.

A first aspect of embodiments of the present disclosure provides a TA abnormality processing method, which is performed by a network device, and the method includes:

- receiving a non-access stratum (NAS) request message; and
- determining subsequent processing according to TA abnormality processing decision information, in response to determining, according to the NAS request message, that a TA abnormality that a TA where a UE is currently located is outside an RA of the UE occurs.

A second aspect of embodiments of the present disclosure provides a TA abnormality processing method, which is performed by UE, and the method includes:

- sending a registration update request based on triggering of a TA abnormality of the UE at a network side, where the registration update request is at least configured to update an RA of the UE.

A third aspect of embodiments of the present disclosure provides a TA abnormality processing apparatus. The apparatus includes:

- a first receiving module, configured to receive a NAS request message; and
- a determining module, configured to determine subsequent processing according to TA abnormality processing decision information, in response to determining, according to the NAS request message, that a TA abnormality that a TA where a UE is currently located is outside a registration area RA of the UE occurs.

A fourth aspect of embodiments of the present disclosure provides a TA abnormality processing apparatus. The apparatus includes:

- a first sending module, configured to send a registration update request based on triggering of a TA abnormality of the UE at a network side, where the registration update request is at least configured to update an RA of the UE.

A fifth aspect of embodiments of the present disclosure provides a communication device. The communication device includes a processor, a transceiver, a memory, and an executable program stored on the memory and operable on the processor. The processor, when executing the executable program, performs the TA abnormality processing method provided by the first aspect or the second aspect.

A sixth aspect of embodiments of the present disclosure provides a computer storage medium, and the computer storage medium stores an executable program; the executable program can, after being executed by a processor, implement the TA abnormality processing method provided by the first aspect or the second aspect.

It is to be understood that the above general description and the following detailed description are merely illustrative and explanatory, and not intended to limit the embodiments of the present disclosure.

BRIEF DESCRIPTION OF THE DRAWINGS

The accompanying drawings here are incorporated into the description and constitute a part of the present description, showing embodiments consistent with the present disclosure, and are used together with the description to explain the principles of the embodiments of the present disclosure.

DETAILED DESCRIPTION

The illustrative embodiments will be described in detail here, and examples of the illustrative embodiments are shown in the accompanying drawings. When the following description involves the accompanying drawings, unless otherwise indicated, the same numerals in different accompanying drawings indicate the same or similar elements. The embodiments described in the following embodiments do not represent all embodiments consistent with the embodiments of the present disclosure. On the contrary, these embodiments are merely examples of apparatuses and methods consistent with some aspects of the embodiments of the present disclosure, as detailed in the appended claims.

The terms used in the embodiments of the present disclosure are for the purpose of describing particular embodiments merely and are not intended to limit the embodiments of the present disclosure. The singular forms “a”, “an”, and “the” used in the embodiments of the present disclosure and the appended claims are intended to include the plural forms as well, unless the context clearly indicates otherwise. It is also to be understood that the term “and/or” as used here refers to and encompasses any or all possible combinations of one or more associated listed items.

It is to be understood that, although the terms “first”, “second”, “third”, and the like may be used to describe various information in the embodiments of the present disclosure, the information is not limited to these terms. These terms are merely used to distinguish information of the same type from each other. For example, “first information” may also be referred to as “second information” without departing from the scope of the embodiments of the present disclosure. Similarly, “second information” may also be referred to as “first information”. Depending on the context, the word “if” as used here may be interpreted as “in the event of . . . ” or “when . . . ” or “in response to determining”.

As a radio cell and the UE move, the UE may have entered a new TA, but the new TA may not be included in the TAL corresponding to the RA, and the UE does not sense that the UE has entered the new TA, so the UE does not update the TA by initiating a registration update process, resulting in a TA abnormality.

Figure 1:
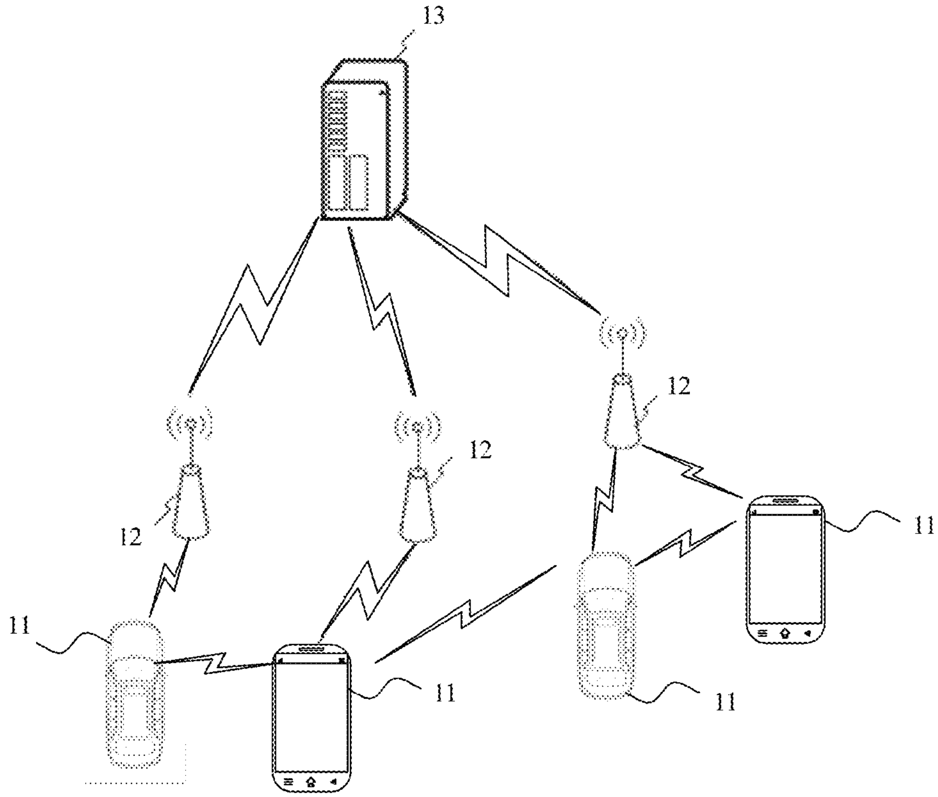
FIG. 1 is a schematic structural diagram of a radio communication system according to an illustrative embodiment.

FIG. 1 illustrates a schematic structural diagram of a radio communication system provided by an embodiment of the present disclosure. As shown in FIG. 1, the radio communication system is a communication system based on cellular mobile communication technology. The radio communication system may include several UEs 11 and several access devices 12.

The UE 11 may refer to a device that provides voice and/or data connectivity to a user. The UE 11 may communicate with one or more core networks via a radio access network (RAN). The UE 11 may be an internet of things (IoT) UE, such as a sensor device, a mobile phone (or referred to as a “cellular” phone), or a computer with an IoT UE, for example, may be a fixed device, a portable device, a pocket device, a hand-held device, a computer built-in device or a vehicle-mounted device. For example, the UE 11 may be a Station (STA), a subscriber unit, a subscriber station, a mobile station, a mobile, a remote station, an access point, a remote terminal UE, an access terminal UE, a user terminal, a user agent, a user device, or a user equipment (UE). Alternatively, the UE 11 may also be a device for an unmanned aerial vehicle. Alternatively, the UE 11 may also be a vehicle-mounted device, for example, an electronic control unit with a radio communication function, or a radio communication device externally connected to an electronic control unit. Alternatively, the UE 11 may also be a roadside device, for example, a street lamp, a signal lamp or other roadside devices with a radio communication function.

The access device 12 may be a network-side device in the radio communication system. The radio communication system may be a $4^{th}$ generation mobile communication (4G) system, also referred to as a long-term evolution (LTE) system; alternatively, the radio communication system may also be a $5^{th}$ generation mobile communication network technology (5G) system, also referred to as a new radio (NR) system or 5G NR system. Alternatively, the radio communication system may also be a next generation of the 5G system. The access network in the 5G system may be referred to as a new generation-radio access network (NG-RAN), or a Machine Type Communication (MTC) system.

The access device 12 may be an evolved access device used in the 4G system, such as an eNB (evolved node B). Alternatively, the access device 12 may also be an access device that adopts a central distributed architecture in the 5G system, such as a gNB (generation node B). The access device 12 generally includes a central unit (CU) and at least two distributed units (DUs) in a case of adopting the central distributed architecture. The central unit is provided with a protocol stack of a packet data convergence protocol (PDCP) layer, a radio link control (RLC) protocol layer, and a media access control (MAC) layer, and the distributed unit is provided with a protocol stack of a physical (PHY) layer. The implementation of the access device 12 is not limited to the embodiments of the present disclosure.

A radio connection may be established between the access device 12 and the UE 11 through a radio air interface. In different embodiments, the radio air interface is a radio air interface based on the $4^{th}$ generation mobile communication network technology (4G) standard; alternatively, the radio air interface is a radio air interface based on the $5^{th}$ generation mobile communication network technology (5G) standard. For example, the radio air interface is a new radio; alternatively, the radio air interface may also be a radio air interface based on a next-generation mobile communication network technology standard of the 5G.

In some embodiments, an end-to-end (E2E) connection may also be established between the UEs 11, for example, vehicle-to-vehicle (V2V) communication, vehicle-to-infrastructure (V2I) communication, and vehicle-to-pedestrian (V2P) communication in vehicle-to-everything (V2X) communication.

In some embodiments, the radio communication system may further include a network management device 13.

Several access devices 12 are connected to the network management device 13, respectively. The network management device 13 may be a core network device in the radio communication system. For example, the network management device 13 may be a mobility management entity (MME) in an evolved packet core (EPC). Alternatively, the network management device may also be another core network device, for example, a serving gateway (SGW), a public data network gateway (PGW), a policy and charging rules function (PCRF), or a home subscriber server (HSS). The implementation form of the network management device 13 is not limited to the embodiments of the present disclosure.

Figure 2:
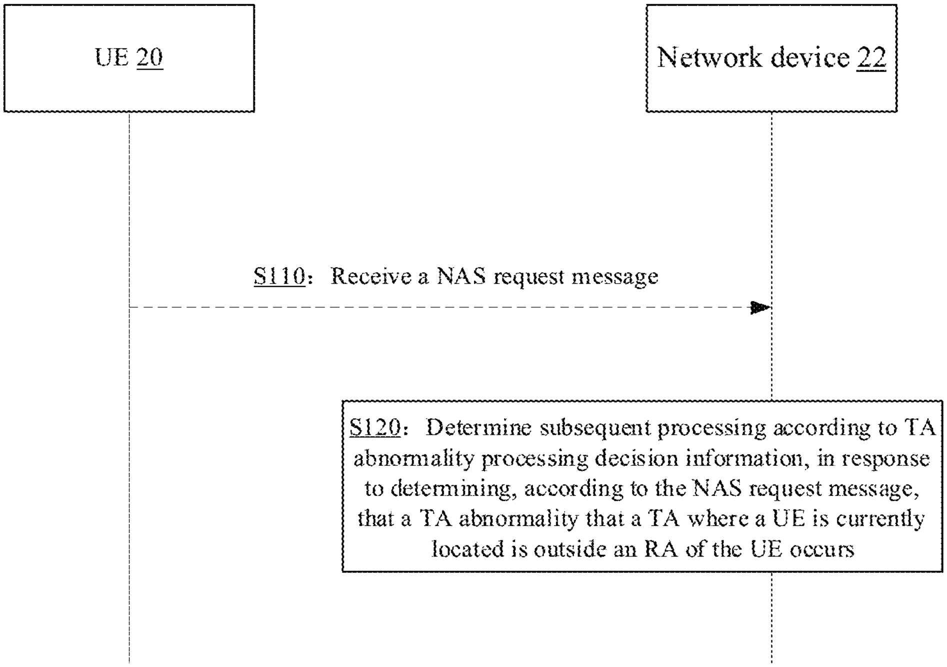
FIG. 2 is a schematic flowchart of a TA abnormality processing method according to an illustrative embodiment.

As shown in FIG. 2, an embodiment of the present disclosure provides a TA abnormality processing method. The method is performed by a network device and includes:

S110: receiving a NAS request message; and

S120: determining subsequent processing according to TA abnormality processing decision information, in response to determining, according to the NAS request message, that a TA abnormality that a TA where a UE is currently located is outside an RA of the UE occurs.

The network device here includes, but is not limited to, a network device of a core network. The network device of the core network includes, but is not limited to, an access management function (AMF).

The UE 20 sends the NAS request message to the core network 22 when performing a service request or requesting to establish a protocol data unit (PDU) session request.

In some embodiments, the NAS request message contains the TA where the UE is currently located.

The TA of the UE is considered abnormal if the network device receives the NAS request message and finds that the TA contained in the NAS request message is not included in the TA corresponding to the RA.

There are several reasons for the TA abnormality, but the following provides one possible reason:

the TA abnormality occurs when the UE moves to a new TA in a cell accessed by the UE (e.g., a cell under satellite access) while the new TA is not included in the TA contained in an RA registered by the UE. The UE actively triggers a registration update process if the UE itself finds that the UE has entered the new TA; the UE does not actively trigger a registration update process if the UE does not sense that the UE has entered the new TA, so as to directly reach the network side, and a network-side device finds such a TA abnormality of the UE.

Figure 4:
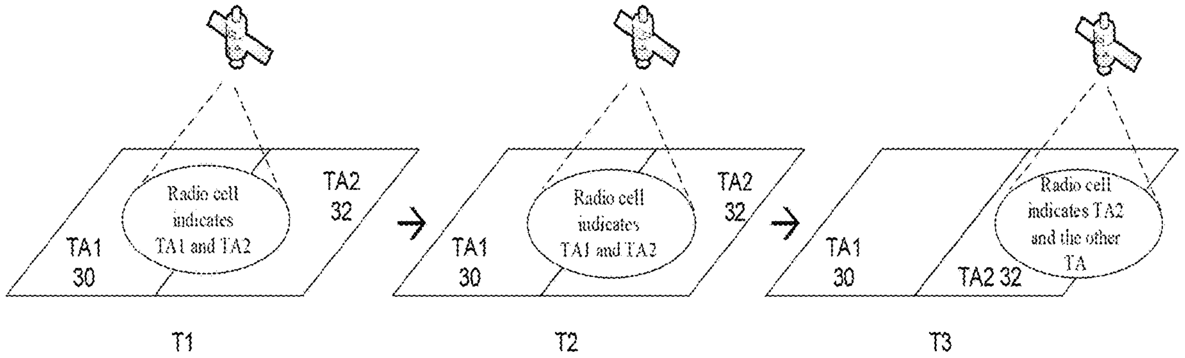
FIG. 4 is another schematic diagram of TA switching in a radio cell according to an illustrative embodiment.

For example, as shown in FIG. 4, the UE is in a TA1 at time T1, and accesses a 5G core network through a satellite. The satellite broadcasts a plurality of TAs (TA1 and TA2) to the UE. The UE completes access registration, and the network side generates RAs (including TA1 and other TAs, but excluding TA2) for the UE. The UE moves into the TA2 at time T2. Since the satellite broadcasts the same TA to the UE at T1 and T2, the UE does not sense that a TA update has occurred in the UE, so the UE does not update the RA by initiating a registration update. A gNB reports a location TA2 where the UE is currently located to the network side if the UE initiates a service request at time T2, and the network side finds that the location TA2 where the UE is currently located is not included in the RA of the UE, resulting in the TA abnormality of the UE. The above is merely a simple example of a reason for the TA abnormality of the UE. There are many methods upon implementation, which are not limited to the above example.

Figure 3:
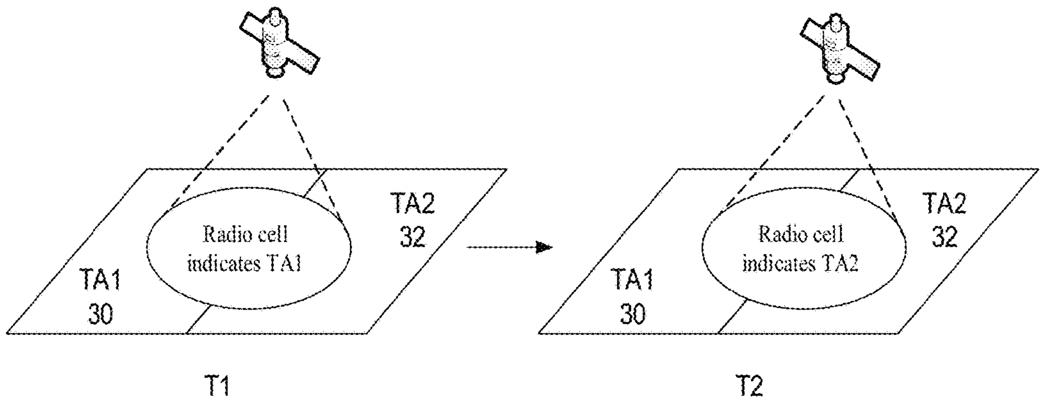
FIG. 3 is a schematic diagram of TA switching in a radio cell according to an illustrative embodiment.

As shown in FIG. 3 and FIG. 4, a satellite may be connected to a 5G core network (CN). The satellite and a radio cell may broadcast one or more TAs for a public land mobile network (PLMN), and the UE determines a TA of the UE based on the broadcast information.

In one case, the radio cell broadcasts a TA, and the UE takes this TA as a TA where the UE is currently located.

As shown in FIG. 3, assuming that the satellite and the radio cell are located in a location 1 at time T1, and are mostly covered in TA1 30, a broadcast message contains TA1. if the satellite and the radio cell move, for example, move from left to right as shown in FIG. 3, the radio cell may cover both TAs (i.e., TA1 30 and TA2 32) simultaneously at a certain time, or gradually switch from covering TA1 to not covering TA1 and completely covering TA2. If the satellite and the radio cell move into TA2 at time T2, the TA where the radio cell is currently located is considered to be TA2, and TA2 is broadcast to the UE.

In another case, the radio cell broadcasts a plurality of TAs at once. As shown in FIG. 4, since the radio cell covers both TA1 and TA2 simultaneously at time T1 to T2, the satellite and the radio cell broadcast both TA1 and TA2 to the UE simultaneously. At time T3, the satellite and the radio cell move to covering TA2 and other TAs in the right side of TA2, and the satellite and the radio cell broadcast TA2 and the other TAs to the UE.

In either of the above cases, the AMF pages the UE based on the TA included in the RA of the UE. If the AN or RAN may determine the TA where the UE is currently located from the RA, the UE is paged within this TA.

The UE initiates a registration update. A network device of a core network, such as an AMF updates the RA of the UE during the registration update process when the TA where the UE is currently located is not included in the RA of the UE. The updated TA includes the TA where the UE is currently located and a TA that may be accessed by the UE, which facilitates successful paging of the UE subsequently.

For example, as shown in FIG. 4, the UE is connected to a 5G network through a satellite if the UE is located in TA1 at time T1. The satellite and the radio cell broadcast TA1 and TA2 to the UE, and the UE determines the TA where the UE is located according to the broadcast information, and completes the registration. As part of the registration process, an AMF generates RAs (including TA1 and other TAs, but excluding TA2) for the UE. The UE moves from TA1 to TA2 at time T2. Since the satellite and the radio cell continuously broadcast TA1 and TA2 to the UE at time T1 and T2, the UE may not sense changes of the TA where the UE is located, and does not update the RA by triggering a registration update. However, if the UE initiates a service request process at time T2, the gNB reports the TA2 where the UE is currently located (acquired by the gNB by measurement) to the AMF, the AMF determines that the TA2 where the UE is currently located is not included in the RA of the UE, and at this time the AMF may determine that the TA abnormality aforementioned has occurred in the UE.

After a base station receives the NAS request message sent by the UE, the base station includes the location information of the UE (including the TA where the UE is currently located) in the NAS request message. For example, the TA where the UE is currently located in the NAS request message may be part of the user location information (ULI) in Next Generation Application Protocol (NGAP). A TA abnormality that is not known to the UE occurs if the TA indicated by the ULI is not included in the RA of the UE.

The NAS request message contains the TA where the UE is currently located when the UE sends the NAS request message. For example, the TA where the UE is currently located in this NAS request message may be part of the user location information (ULI) in NGAP. A TA abnormality that is not known to the UE occurs if the TA indicated by the ULI is not included in the RA of the UE.

In the embodiments of the present disclosure, subsequent processing for the TA abnormality is determined according to TA abnormality processing decision information if the network device determines that the UE has the TA abnormality. In this case, the subsequent processing for the TA abnormality suitable for the current scenario may be determined, so that the TA abnormality accords with current requirements.

The TA abnormality decision information may be any information that may be configured to decide how to perform subsequent steps or how to process the TA abnormality after finding the TA abnormality.

In one embodiment, the TA abnormality decision information includes, but is not limited to: information associated with the NAS request message, information associated with the UE attributes, and/or registration update cycle information of the UE.

The information associated with the NAS request message may be configured to determine a service delay requirement and/or a delay requirement in response to currently receiving the NAS request message and/or a UE location accuracy requirement, etc.

The information associated with the UE attributes may be configured to determine a communication service delay requirement and/or quality of service (QoS), etc.

The registration update information configured for the UE may indicate whether the UE is configured with a periodic registration update. If the UE is configured with the periodic registration update, whether the RA update is implemented by waiting for the periodic registration update or the RA of the UE is updated by the network side actively triggering the UE to perform a registration update may be determined based on a time interval between an update time of the next periodic registration update and a time at which the TA abnormality is determined.

In summary, the TA abnormality processing decision information may be any preset information that may be configured to decide how to perform subsequent processing steps for the TA abnormality. The specific information is not limited here.

In some embodiments, the subsequent processing includes at least one of the following:

- ignoring the TA abnormality, and responding to the NAS request message;
- rejecting the NAS request message, and updating the RA by triggering the UE to initiate a registration update; or
- responding to the NAS request message, and updating the RA by triggering the UE to initiate the registration update after the response to the NAS request message is completed.

In some embodiments, a network device, such as an AMF, determines the TA abnormality. However, considering that the response to the current NAS request message is not related to the TA where the UE is located, but may be very close to an update time of the registration cycle of the UE, and the registration cycle of the UE also triggers the UE to update the TA stored in the UE itself, a specific TA abnormality processing may not need to be carried out currently for the TA abnormality. In consideration of a timely response to the NAS request message, the TA abnormality may be ignored, and subsequent steps in response to the NAS request message may be continued. In addition, the TA abnormality is eliminated with the help of the periodic registration update of the UE, thus reducing the interaction introduced by the network side actively triggering the UE to perform the registration update.

In some embodiments, it is found according to the TA abnormality processing decision information that the response to the current NAS request message may have a great correlation with the TA where the UE is located, so the NAS request message may be rejected first, and the UE is triggered to actively initiate the registration update through which the RA may be updated. The NAS request message is then responded to after the RA update is completed.

In another embodiment, also considering that the response to the NAS request message may not be related to the TA where the UE is located, and may be far from an update time of the registration cycle of the UE, considering the problems that may be caused by the TA abnormality, the UE is actively triggered to perform the registration update after the response to the NAS request message, so that the RA of the UE is updated.

In some embodiments, the method further includes:

- temporarily storing the NAS request message, updating the RA by triggering the UE to initiate a registration update, and responding to the temporarily stored NAS request message after the RA update. In this case, the TA abnormality processing is completed prior to the response to the NAS request message, and the UE does not need to resend the NAS request message, so a delay caused by resending the NAS request message is reduced.

Which specific type of subsequent processing to be performed may be determined by a network device such as an AMF. There are many specific decision-making methods, which will not be further illustrated by giving examples here.

In some embodiments, rejecting the NAS request message includes:

- sending a rejection message for the NAS request message to the UE, and the rejection message includes a rejection reason; the rejection reason indicates the TA abnormality.

The rejection message is sent to the UE if the response to the NAS request message is rejected due to the TA abnormality of the UE. At the same time, in the embodiments of the present disclosure, a reason indication indicating the TA abnormality and/or the registration update may be carried in the rejection message, in order to inform the UE of the rejection reason. For example, the rejection message includes a rejection code or a reason value that indicates the rejection reason. The rejection code or reason value being a specific value indicates the TA abnormality and/or registration update.

In some embodiments, the UE reinitiates the registration update process to achieve the RA update when the indicated rejection reason carried by the rejection message is the TA abnormality. Therefore, the rejection reason indicating the TA abnormality is configured to update the RA of the UE by triggering the UE to initiate the registration update.

In some embodiments, the network side may also specifically send a triggering indication that triggers the UE to initiate the registration update process after sending the rejection message. In the embodiments of the present disclosure, the rejection reason for the rejection message triggers the UE to initiate the registration update, which reduces NAS signaling of the interaction between the network side and the UE, and features a simple interaction process and low signaling overhead.

In some embodiments, the method further includes at least one of the following:

- stopping the triggering of the registration update in response to determining that a registration update request from the UE is received in the process of triggering the RA update of the UE; or
- stopping the triggering of the registration update in response to determining that a time at which the RA update of the UE is triggered is an update time of a registration update cycle of the UE.

If it is found that a registration update request sent by the UE is received when determining to trigger the UE to perform the RA update upon determining the TA abnormality of the UE based on the NAS request message, the triggering is not needed, so the triggering of the registration update may be stopped, that is, stopping sending a triggering indication to the UE.

If it is determined that an update time of the registration update cycle of the UE is reached when the UE is determined to be abnormal based on the NAS request message, the UE obviously does not need to be triggered. The UE itself also initiates the registration update request due to the arrival of the registration update cycle, so the triggering of the UE for the registration update may be stopped; that is, at least sending the triggering indication to the UE may be stopped.

In the embodiments of the present disclosure, the registration update process is triggered by the registration update request sent by the UE. It is noted that the registration update process is the same as the registration process, but the parameters carried by the messages transmitted by the initial registration process and the registration update process may be different.

Figure 5:
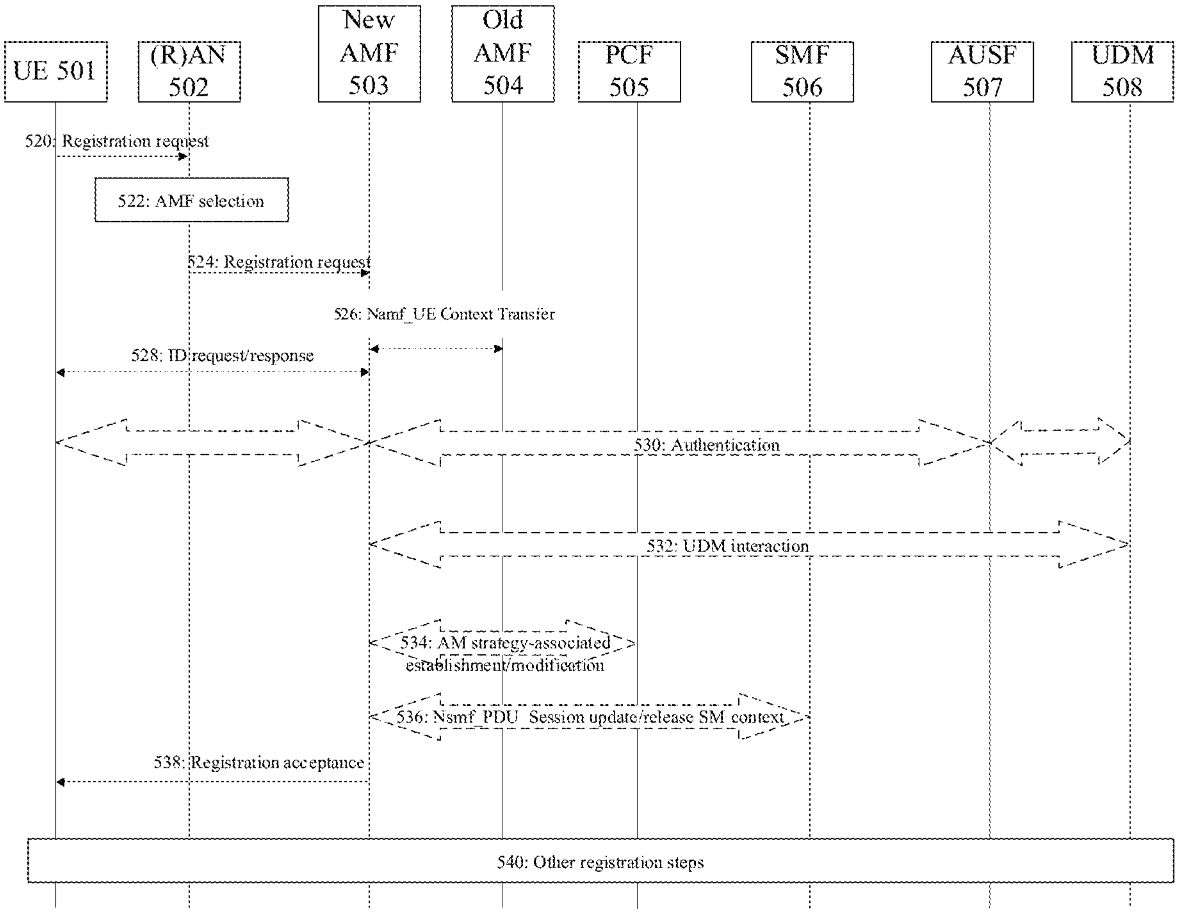
FIG. 5 is a schematic flowchart of a TA abnormality processing method according to an illustrative embodiment.

FIG. 5 shows a registration process, which may include:

At 520, an access network (AN) or RAN 502 receives a registration request from UE 501. The registration request includes: an AN parameter, a registration type, a user subscription permanent identifier (SUPI) or a 5G globally unique temporary UE identity (GUTI), a permanent equipment identifier (PEI), requested NSSAI, a last accessed and available TA, etc. The registration type indicates whether the UE needs to perform an initial registration, a mobile registration update, a periodic registration update, or a permanent registration. The last accessed TA may be used to help a network device, such as an AMF determine the RA of the UE.

After receiving the registration request, at 522, the AN or RAN selects an AMF for the UE. For example, the AN or RAN selects the AMF for the UE based on information such as an RAT used to transmit the registration request and the requested NSSAI. If the RAN cannot select a suitable AMF for the UE, the AMF configured by the RAN or AN is sent to the RAN registration message; that is, the AMF configured by the RAN or AN is selected as the AMF of the UE.

At 524, the registration request is sent to the selected AMF. The registration request is carried by the RAN or AN in an N2 message and sent to the selected AMF. N2 parameters of the N2 message may include, but are not limited to: a registration request, an identity (ID) of a selected PLMN, location information, a cell ID of a cell where the UE is located, etc.

At 526, a new AMF 503 acquires a SUPI of the UE and a context of the UE from the old AMF 504 if a serving AMF of the UE has a change relative to the AMF selected for a previous registration.

At 528, the new AMF acquires the SUCI by initiating an ID request process if the UE does not provide the SUCI or the old AMF does not provide the SUCI.

At 530, the new AMF determines to initiate UE authentication that involves an authentication server function (AUSF) 507 to the UE. For example, the new AMF may select an AUSF based on the SUPI or SUCI of the UE.

If the AMF of the UE is switched relative to the previous registration process or the SUPI provided by the UE does not involve a valid context in the AMF, at 532, the AMF selects and registers to a unified data management (UDM) 508 based on the SUPI. If the AMF does not acquire subscription data of the UE, the subscription data of the UE is acquired from the UDM.

At 534, the new AMF and the PCF 505 interact with each other regarding a process for establishment or modification of a mobility management (AM) strategy.

At 536, if a PDU session containing the registration request is activated, the new AMF activates a user plane connection of the PDU session by sending an Nssmf_PDU Session Update SM Context request to the SMF 506 associated with the PDU session.

At 538, the new AMF indicates that the registration request has been accepted by sending a registration acceptance message to the UE. The registration acceptance message contains: RA, mobility restrictions, allowed NSSAI, periodic registration timer indications, and other information. Information of a new RA is sent to the UE if the AMF is assigned the new RA. If the UE is not assigned the new RA, the information of the RA is not carried in the registration acceptance message, and the old RA is still valid.

The steps of the remaining registration process 540 are not described one by one here.

Triggering the above registration process further includes at least one of the following:

- a registration update triggered by the UE while the UE moves to a TA outside the RA: regardless of whether the UE is in a connected or non-connected state, the UE achieves the RA update by executing the above registration process while the UE moves to the TA outside the RA, and the non-connected state at least includes: an idle state and/or an inactivated state;
- a registration update triggered by a parameter update: the UE may actively initiate a registration request to achieve the RA update through the registration update, regardless of whether the UE moves to a new TA when the UE needs to update the UE's own capabilities or update protocol parameters negotiated during the registration process; or
- a periodic registration update: the registration update is initiated every other a predefined inactivation time based on the predefined inactivation time, thus achieving the registration update.

Figure 6:
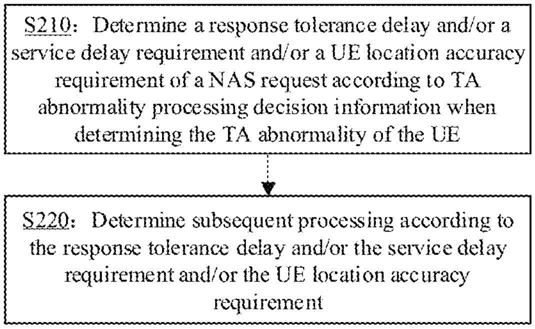
FIG. 6 is a schematic flowchart of a TA abnormality processing method according to an illustrative embodiment.

As shown in FIG. 6, an embodiment of the present disclosure provides a TA abnormality processing method. The method, in the case of determining a TA abnormality of UE, may include:

- S210: determining a response tolerance delay and/or a service delay requirement and/or a UE location accuracy requirement of a NAS request message according to TA abnormality processing decision information, when determining the TA abnormality of the UE; and
- S220: determining subsequent processing according to the response tolerance delay and/or the service delay requirement and/or the UE location accuracy requirement.

The subsequent processing includes at least one of the following:

- ignoring the TA abnormality, and responding to the NAS request message in response to no TA abnormality;
- responding to the NAS request message, and eliminating the TA abnormality by triggering the UE to initiate a registration update after the response to the NAS request message is completed;
- rejecting the NAS request message, and carrying the TA abnormality or a rejection reason for the registration update in a rejection message for the NAS request message; or
- pending the NAS request message, triggering the UE to initiate a registration update and resuming the response to the pending NAS request message after the registration update is completed. The pending NAS request message includes: temporarily storing the NAS request message.

For example, the response tolerance delay and/or the service delay requirement and/or the UE location accuracy requirement of the NAS request message is determined according to any one of the TA abnormality processing decision information. In a case where an allowable delay of the response to the current NAS request message is large or the service delay requirement is low, it is indicated that even if the response to the NAS request message is delayed currently, and even if the response to the NAS request message is rejected, the RA update is completed first, which is not sensitive to users or services. In a case where the allowable delay of the response to the current NAS request message is small or the service delay requirement is high, that is, the NAS request message is highly sensitive to the delay, the response to the NAS request message needs to be prioritized, while the TA abnormality may be processed after the response to the NAS request message or be temporarily not processed.

In a case of determining that the response process or service of the NAS request message requires high UE location accuracy based on the TA abnormality decision information, for example, the UE location accuracy is higher than a preset threshold, or in a case of predicting that the current UE location accuracy cannot meet requirements in the response process of the NAS request message or requirements of services for a user location, it is considered that the TA abnormality needs to be eliminated first, and a response to the suspended NAS request message is performed.

In some embodiments, S120 may include one of the following:

selecting to ignore the TA abnormality and continuing to respond to the NAS request message when a response tolerance delay satisfies a first condition;

selecting to continue to respond to the NAS request message when the response tolerance delay satisfies the first condition, and triggering UE to perform a registration update after the response to the NAS request message is completed;

selecting to reject the NAS request message when the response tolerance delay does not satisfy the first condition, triggering the UE to initiate the registration update to update an RA by carrying a rejection reason indicating the TA abnormality or the registration update in a rejection message for the NAS request message, receiving the NAS request message resent by the UE after the RA update, and responding to the NAS request message;

updating the RA by triggering the UE to initiate the registration update when the response tolerance delay does not satisfy the first condition, and continuing to respond to the temporarily stored NAS request message after the RA update;

selecting to ignore the TA abnormality and continuing to respond to the NAS request message when the UE location accuracy requirement of the response to the NAS request message accords with a second condition;

selecting to continue to respond to the NAS request message when the UE location accuracy requirement of the response to the NAS request message accords with the second condition, and triggering the UE to perform a registration update after the response to the NAS request message is completed;

selecting to reject the NAS request message when the UE location accuracy requirement of the response to the NAS request message does not accord with the second condition, triggering the UE to initiate the registration update to update the RA by carrying the rejection reason indicating the TA abnormality or the registration update in the rejection message for the NAS request message, receiving the NAS request message resent by the UE after the RA update, and responding to the NAS request message; and updating the RA by triggering the UE to initiate the registration update when the UE location accuracy requirement of the response to the NAS request message does not accord with the second condition, and continuing to respond to the temporarily stored NAS request message after the RA update.

Triggering the registration update by the UE: the registration update by the UE may be triggered by sending a configuration update command to the UE. The configuration update command is one of the triggering indications.

In some embodiments, the selecting to ignore the TA abnormality and continuing to respond to the NAS request message when the response tolerance delay satisfies the first condition may further include:

selecting to ignore the TA abnormality and continuing to respond to the NAS request message when the response tolerance delay or the service delay satisfies the first condition, and it is found that a time interval between a time at which the TA abnormality occurs and a next update time of a periodic update of the UE is less than a preset threshold.

The selecting to continue to respond to the NAS request message when the response tolerance delay or the service delay satisfies the first condition, and triggering the UE to perform the registration update after the response to the NAS request message is completed includes:

selecting to continue to respond to the NAS request message, and triggering the UE to perform the registration update after the response to the NAS request message is completed, when the response tolerance delay or the service delay satisfies the first condition and it is found that the time interval between the time at which the TA abnormality and a next update time of a periodic update of the UE is not less than a preset threshold.

The response tolerance delay or the service delay satisfies the first condition, including but not limited to at least one of the following:

the response tolerance delay is less than a preset duration threshold;

the response tolerance delay is less than a duration required for registration update process of the UE;

the service delay is less than a preset duration threshold; or the service delay is less than a duration required for the registration update process of the UE.

The service delay that satisfies the first condition here is a delay defined by the service delay requirement mentioned in any of the preceding examples.

The response tolerance delay does not satisfy the first condition, including but not limited to at least one of the following:

the response tolerance delay is not less than the preset duration threshold;

the response tolerance delay is not less than the duration required for registration and update processes of the UE;

the service delay is not less than the preset duration threshold; or the service delay is not less than a duration required for the registration update process of the UE.

The first condition here is that: a service delay corresponding to the response tolerance delay and/or service delay requirement is less than a preset duration threshold; or a service delay corresponding to the response tolerance delay and/or service delay requirement is less than a duration required for the registration update process of the UE.

The UE location accuracy requirement of the response to the NAS request message accords with a second condition, including:

the UE location accuracy requirement of the response to the NAS request message reaches a preset accuracy.

The UE location accuracy requirement of the response to the NAS request message accords with the second condition, including:

the response to the NAS request message does not involve the location information of the UE;

and/or the response to the NAS request message involves the location information of the UE, but an accuracy requirement for the location information of the UE is lower than a preset accuracy.

The second condition here is that: the UE location accuracy requirement of the response to the NAS request message reaches the preset accuracy; or the response to the NAS request message does not involve the location information of the UE.

In some embodiments, whether a network device on a core network such as an AMF firstly caches the NAS request message that needs to be responded to and continues the response after the RA update is completed, or waits for the UE to reinitiate the NAS request message for response after the RA update is completed, may be determined based on whether the network device on the core network such as the AMF has an ability to cache the NAS request message, or based on whether the UE has enabled a caching service for the NAS request message.

In yet some embodiments, with respect to whether the network device on the core network such as the AMF firstly caches the NAS request message that needs to be responded to and continues the response after the RA update is completed, or waits for the UE to reinitiate the NAS request message for response after the RA update is completed, it may be determined by further subdividing the response tolerance delay of the NAS request message. If the response tolerance delay does not satisfy the first condition, but satisfies a third condition, the network device may first cache the NAS request message that needs to be responded to and then respond to the NAS request message after triggering the UE to complete the registration update. The tolerance delay corresponding to the third condition is greater than the tolerance delay corresponding to the first condition.

In some embodiments, the response tolerance delay of the NAS request message and the UE location accuracy requirement of the NAS request message are both considered to comprehensively determine which method to use to process the TA abnormality of the UE.

In some embodiments, the TA abnormality processing decision information includes at least one of the following:

device type information of the UE;

a service type related to the NAS request message;

a data network name (DNN) related to the NAS request message;

network slice information related to the NAS request message;

network slice information contracted by the UE; or an operator operation strategy associated with the UE.

For example, different types of UEs involve different types of services or have different QoS for communication. In view of this, device type information of the UE may be used as the TA abnormality processing information mentioned above, so as to determine the subsequent processing operations in a case where the TA abnormality is found.

A service type related to the NAS request message may be determined by a service carried for the connection established by the interaction of the NAS request message.

Some service types allow a small response delay, while others allow a relatively large response delay. For example, if the service type related to the NAS request message belongs to ultra-reliable and low-latency communication (URLLC), the allowed response delay of the NAS request message is small. If the service type related to the NAS request belongs to enhanced mobile broadband (eMBB), the allowed response delay of the NAS request message is greater than a delay allowed by the URLLC service. Therefore, for the two types of services, URLLC and eMBB, TA abnormality processing may be performed differently when finding the TA abnormality.

Different DNNs involve different QoSs, while the tolerance delays corresponding to different QoSs are different.

The network slice information includes, but not limited to:

single network slice selection assistance information (S-NSSAI);

NSSAI; and network slice type information.

Different network slices may provide service services with different QoSs, such as different delays and different bandwidths.

In some embodiments, some NAS request messages sent by the UE involve network slices, so network slice information associated with the NAS request messages may be determined.

In some embodiments, operators (e.g., communication operators or application operators) provide different communication services to different users. For example, some users enjoy very important person (VIP) services or non-VIP services, or VIP services may be divided into different levels, and different operator operation strategies may be used for different types of users (corresponding to different UEs). If an operator operation strategy indicates that a rate takes precedence, the NAS request message needs to be responded to first.

In this case, in the embodiments of the present disclosure, subsequent processing that is suitable for the current situation is selected based on one or more of the TA abnormality processing decision information, so that appropriate subsequent processing may be performed after the TA abnormality is found, which not only ensures that the NAS request message satisfies an expected QoS, but also timely eliminates the TA abnormality that needs to be processed as much as possible, so as to reduce various problems caused by the existence of the TA abnormality. For example, the TA abnormality leads to a failure in UE paging, etc.

In some embodiments, the NAS request message includes at least one of the following:

a PDU session establishment request message; or a service request message.

Obviously, the above are merely examples. Upon implementation, the NAS request message includes, but is not limited to, the PDU session establishment request, the service request, etc.

Figure 7:
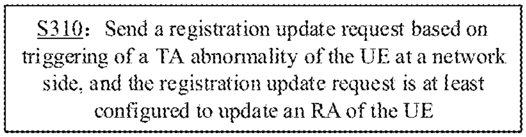
FIG. 7 is a schematic flowchart of a TA abnormality processing method according to an illustrative embodiment.

As shown in FIG. 7, an embodiment of the present disclosure provides a TA abnormality processing method. The method is performed by UE and includes:

S310: sending a registration update request based on the triggering of a TA abnormality of the UE at the network side, and the registration update request is at least configured to update an RA of the UE.

In the embodiments of the present disclosure, the UE receives the triggering of the TA abnormality of the UE sent by the network side, initiates a registration update based on the triggering, and updates the RA of the UE through a registration update, so as to eliminate an RA abnormality.

The triggering may be the triggering of an access network device at the network side, or triggering at a core network side.

In an example, the UE will receive a triggering indication sent by the network side based on the TA abnormality of the UE. The UE performs the registration update by sending a registration update request after receiving the triggering indication.

It is noted that the registration update request here may include the registration request described above. An initial registration process may be used for the registration update.

The TA abnormality here includes: a TA where the UE is currently located being located outside the RA of the UE. In addition, the TA abnormality is determined by the network side. The TA abnormality of the UE may be detected by the network side in various cases. For example, the TA abnormality may be considered to occur if the network side finds that the TA where the UE is currently located is outside the RA of the UE, according to the TA where the UE is currently located, as carried by the NAS request message.

In some embodiments, the method includes:

sending a NAS request message; the NAS request message, added with location information of the UE while passing through the access network device, is configured to determine whether the UE has the TA abnormality.

The NAS request message here includes, but not limited to: a PDU session establishment request and/or a service request message.

A network device of the core network, such as an AMF determines that the UE has the TA abnormality based on the TA where the UE is currently located, as carried by the NAS request message and a RA of the UE recorded by the network device.

In some embodiments, the method further includes:

receiving a rejection message for the NAS request message;

the rejection message contains a rejection reason indicating the TA abnormality, and the UE sends the registration update request based on the rejection reason.

If the network side device determines to solve the TA abnormality after rejecting the NAS request message, the UE receives a rejection message from the network side, and the rejection message generally carries the rejection reason. The rejection reason for the rejection message indicates the TA abnormality if the NAS request message is rejected due to the TA abnormality of the UE.

In some embodiments, the UE also receives an additional triggering indication when receiving the rejection message, and updates the RA by initiating a registration process after receiving the triggering indication.

In the embodiments of the present disclosure, since the rejection reason indicates the TA abnormality, the rejection reason indicating the TA abnormality triggers the UE to initiate the registration update request, thus achieving the RA update.

In some embodiments, the method further includes:

receiving the triggering indication.

In one embodiment, the triggering indication may be sent prior to the NAS request message being responded to, or while or after the NAS request message is rejected.

In some embodiments, the triggering indication may include: indication information indicating the TA abnormality, and the indication information is configured to inform the UE that a reason for initiating the registration update is the TA abnormality.

In another embodiment, the triggering indication is configured to trigger the UE to send the registration update request, and is sent after the NAS request message is responded.

If the triggering indication is updated after the NAS request message of the UE is responded to, the UE receives a NAS response prior to receiving the triggering indication, which firstly ensures that a service related to the NAS request message is provided, in order to ensure a delay of the service related to the NAS request message.

In the embodiments of the present disclosure, the UE also achieves the RA update by initiating the registration update process based on a TA update caused by the mobility of the UE, and also performs the RA update at an update time according to the time at which the registration periodic update; or initiates the RA update when the UE needs to update parameters negotiated in the registration process. The RA update is also synchronized during the registration process initiated by these reasons.

After the network device finds the TA abnormality, the TA abnormality may be processed in one of the following modes.

Mode 1: the network device finds the TA abnormality of the UE as if the UE still operates in its RA, for example, the network device responds to the NAS request message of the UE as usual. At times, the UE may update the RA by initiating the registration update when the UE finds that a TA where a cell accessed by the UE is located is not located in its own RA; alternatively, the UE may also perform the periodic registration update. In this case, such an abnormality may be ignored after an RA abnormality is found at the network side.

Mode 2: after a network device such as an AMF finds the TA abnormality, if the TA where the UE is currently located is a TA that allows the UE to access, the AMF instructs the UE to perform the registration update, 5G Core (5GC) instructs the UE to perform the registration update by rejecting the NAS request message, and the rejection reason indicates the registration update or the TA abnormality. Once the registration update is completed, the UE resends the NAS request message, which is equivalent to restarting the NAS process.

Mode 3: after the network device, such as the AMF, detects the TA abnormality, if the TA where the UE is currently located is a TA that allows the UE to access, the AMF continues to perform the NAS process (that is, continues to respond to the NAS request message). The AMF sends a configuration update command to the UE. The configuration update command may instruct the UE to perform the registration update. The configuration update command may be sent after the AMF finds the TA abnormality. The configuration update command is one of the above-mentioned triggering indications.

The configuration update command may include the triggering indication provided by any of the above-mentioned embodiments.

In order to ensure that the current operation of the network device such as the AMF for the TA abnormality is appropriate, in the embodiments of the present disclosure, the AMF determines which of the above modes is used to process the TA abnormality according to a type of a terminal, a service type, S-NSSAI, NSSAI, a DNN, an operator operation strategy or other information in the event of selecting subsequent operations.

In modes 2 and 3, the AMF stops instructing the registration update of the UE and determines that the TA abnormality is eliminated, while receiving the registration update request sent by the UE or reaching an update time of the periodic registration update of the UE, when the AMF instructs the UE to perform the registration update.

Figure 8:
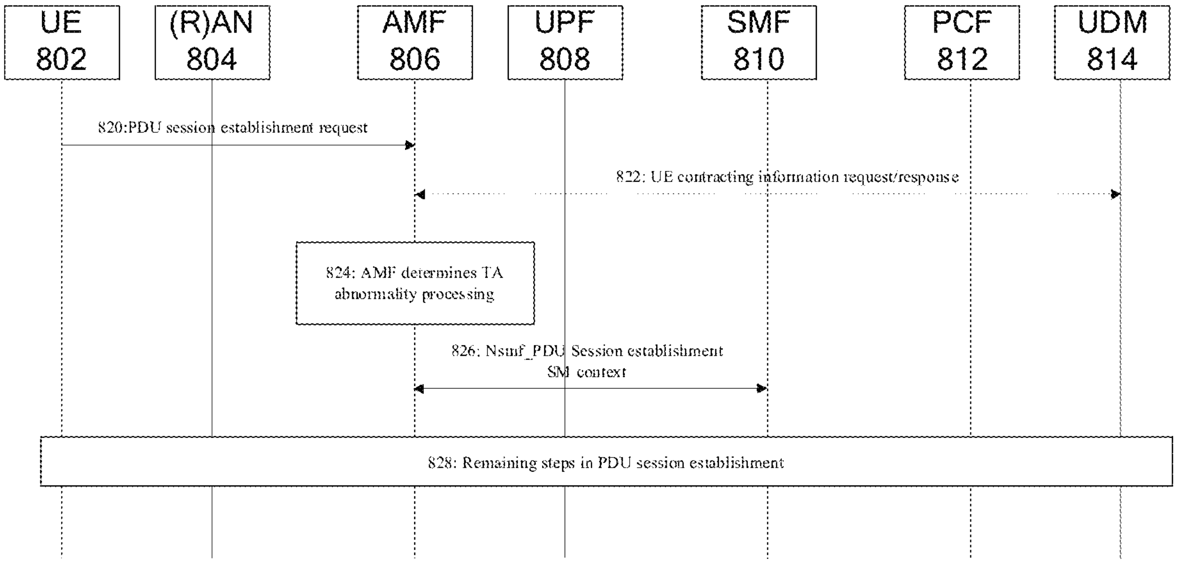
FIG. 8 is a schematic flowchart of a TA abnormality processing method according to an illustrative embodiment.

The NAS request message, being the PDU session establishment request, is taken below as an example, as shown in FIG. 8. The network device, such as the AMF may process the TA abnormality as follows:

At 820, a PDU session establishment request message is received from the UE 802; and At 822, the AMF 806 and the UDM 814 interact for UE contracting information. For example, the AMF sends a request for the UE contracting information to the UDM and receives a response message from the UDM, and the response message contains the UE contracting information. The UE contracting information includes contracted slice information NSSAI of the UE, a contracted data network DNN, a UE type, etc.

At 824, the AMF determines TA abnormality processing. For example, the TA abnormality is determined to occur if the TA where the UE is located, which is included in the PDU session establishment request, is not a TA that prohibits the UE from accessing, and the TA where the UE is currently located is located outside the RA of the UE. Based on the type of the UE, the S-NSSAI, the DNN requested by the UE, and other information, the delay requirement for a service corresponding to the PDU session and whether to require accurate location information of the UE are determined. If the service is not sensitive to the delay and has low requirements for the location accuracy of the UE, the TA abnormality may be ignored first, and a PDU session establishment request process is continued to be performed.

At 826, the AMF interacts with another network function (NF) such as an SMF 810 for the remaining PDU session establishment process.

For example, a text message, a voice, or a video message that is initiated by an instant messaging application, such as a satellite, may not need the accurate location information of the UE, but a service that may be based on a locating application may need the accurate location of the UE.

For example, text information sent by an instant messaging application such as a satellite or a text message sent by a Short Messaging Service (SMS) application, may have low sensitivity to the delay, while a direct call are highly sensitive to the delay. The RAN 804, UPF 808, and PCF 812 shown are not involved in the process of FIG. 8. Remaining steps 828 are not shown in detail.

Figure 9:
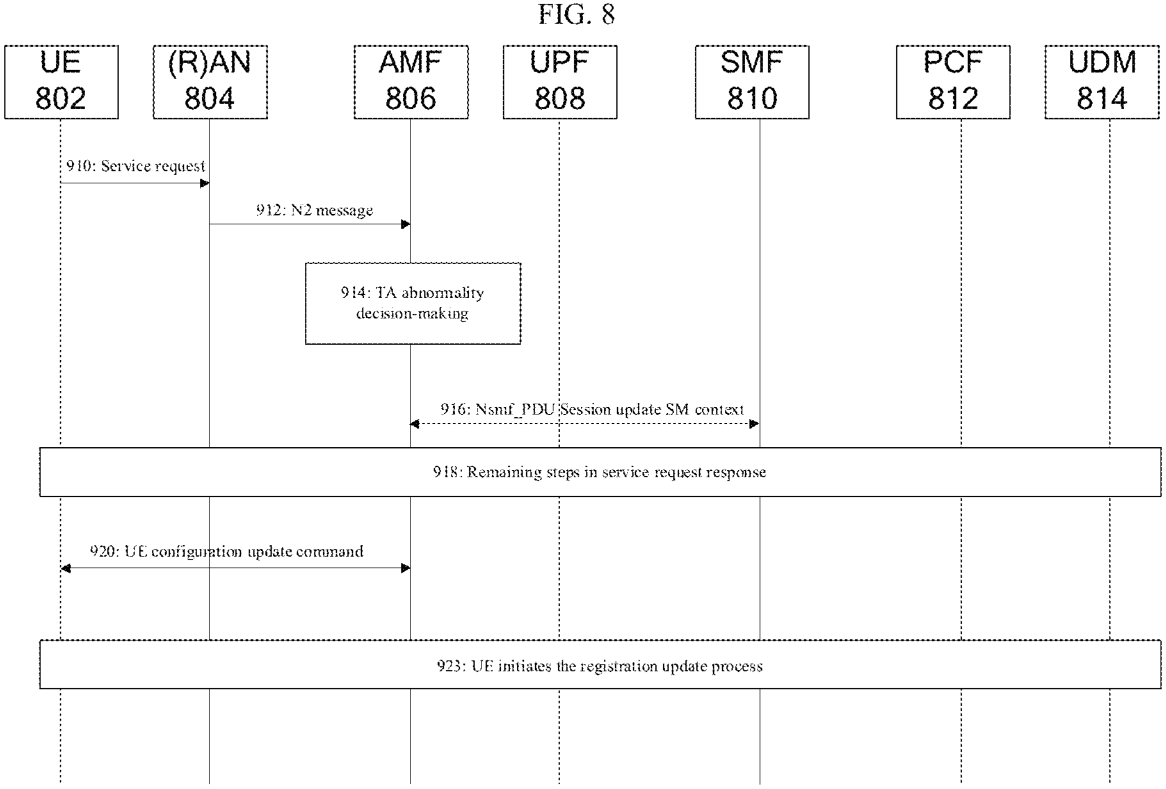
FIG. 9 is a schematic flowchart of a TA abnormality processing method according to an illustrative embodiment.

The NAS request message, being a service request message, is shown below as an example, as shown in FIG. 9. The network device, such as the AMF, may process the TA abnormality as follows:

At 910, an AN or RAN (i.e., an (R)AN 804 shown in FIG. 9) receives a service request message from the UE; the UE initiates the service request process through the NAS message. The NAS message may include: a service request message sent by the UE to the AMF, and the service request message is carried in an RRC message and submitted to the AN or RAN, and the NAS message is sent by the AN or RAN to the AMF after the RRC message is received by the AN or RAN.

After receiving the service request message, at 912, the AN or RAN sends an N2 message to the AMF; the N2 message may carry the location information of the UE, that is, the TA where the UE is currently located.

At 914, after receiving the N2 message, the AMF finds the TA abnormality and determines that the TA abnormality has been processed.

If the TA where the UE is currently located is not a TA that prohibits the UE from accessing, the AMF may further determine the service delay requirement and the UE location accuracy requirement based on a device type of the UE, S-NASSAI, a DNN, a service type, an operator operation strategy and other information, and may determine how to process the TA abnormality. For example, if the service is not delay-sensitive but needs the location of the UE, the AMF determines to first execute the response to the NAS request message, and updates the RA of the UE by triggering the UE to perform the registration update after the response to the NAS request message.

At 916, the AMF continues to respond to the service request message. For example, the AMF responds to the service request message by performing information interaction with other NFs.

At 920, the AMF sends a configuration update command to the UE after the response to the service request message is completed, and the configuration update command will trigger the UE to perform the registration update.

At 923, the UE initiates the registration update.

Figure 10:
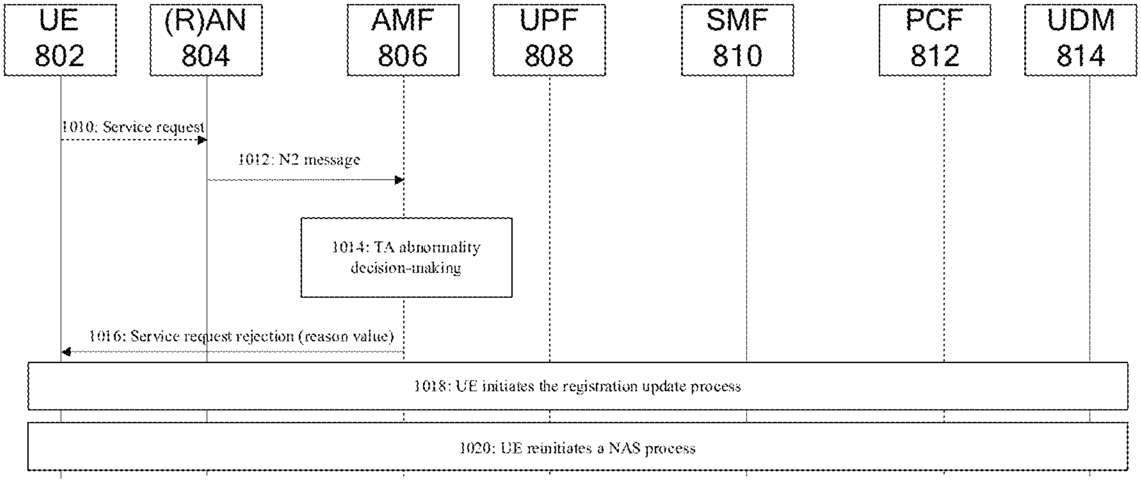
FIG. 10 is a schematic flowchart of a TA abnormality processing method according to an illustrative embodiment.

The NAS request message, being a service request message, is taken below as an example, as shown in FIG. 10. The network device, such as the AMF, may process the TA abnormality as follows:

At 1010, an AN or RAN (i.e., an (R)AN shown in FIG. 10) receives a service request message from the UE; the UE initiates a service request process through the NAS message. The NAS message may include: a service request message sent by the UE to the AMF, and the service request message is carried in an RRC message and submitted to the AN or RAN, and the NAS message is sent by the AN or RAN to the AMF after the RRC message is received by the AN or RAN.

At 1012, the AN or RAN sends an N2 message to the AMF, and the N2 message contains the service request message and the location information of the UE. The location information contains the TA where the UE is currently located. After the AMF receives the N2 message from the AN or RAN at 1014, whether the TA abnormality has occurred is determined. For example, the TA abnormality has occurred if the TA where the UE is currently located is outside the TA contained in the RA. If the TA abnormality occurs, how to process the TA abnormality is determined based on at least one of a UE type, S-NASSI, a DNN, operator strategy information, etc.

For example, at 1016, the AMF may send a rejection message that rejects the service request message. The rejection message triggers the UE to initiate the registration update at 1018.

After receiving a triggering indication for the registration update, the UE initiates the registration process so that the RA recorded by the AMF contains the TA where the UE is currently located.

Once the registration update process is completed, at 1020, the UE resends the service request message.

Figure 11:
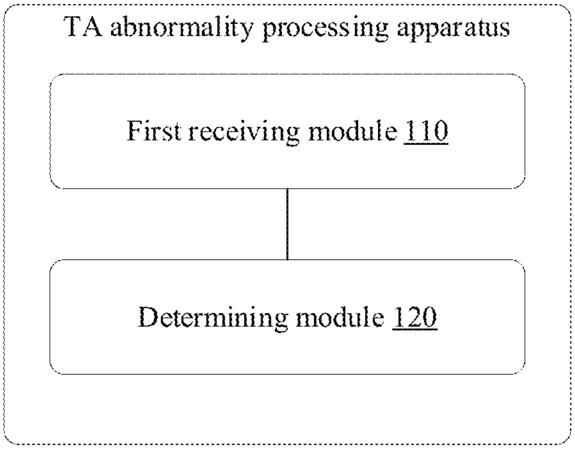
FIG. 11 is a schematic structural diagram of a TA abnormality processing apparatus according to an illustrative embodiment.

As shown in FIG. 11, an embodiment of the present disclosure provides a TA abnormality processing apparatus. The apparatus includes:

a first receiving module 110, configured to receive a NAS request message; and a determining module 120, configured to determine subsequent processing according to TA abnormality processing decision information, when determining, according to the NAS request message, that a TA abnormality that a TA where a UE is currently located is outside a registration area RA of the UE occurs.

The TA abnormality processing apparatus provided in this embodiment of the present disclosure may be applied to a network device or included in the network device.

In some embodiments, the first receiving module 110 and the determining module 120 may be program modules. The program modules can, after being executed by a processor, receive the NAS request message and determine subsequent processing according to the TA abnormality decision information when the TA abnormality occurs.

In some embodiments, the first receiving module 110 and the determining module 120 may both be modules combining hardware and software. The modules combining hardware and software include, but are not limited to: various programmable arrays. The programmable arrays include, but are not limited to, field-programmable arrays and/or complex programmable arrays.

In some embodiments, the first receiving module 110 and the determining module 120 may be software-only modules. The software-only modules include, but are not limited to: application-specific integrated circuits.

In some embodiments, the subsequent processing includes at least one of the following:

ignoring the TA abnormality, and responding to the NAS request message;

rejecting the NAS request message, and updating the RA by triggering the UE to initiate a registration update; or responding to the NAS request message, and updating the RA by triggering the UE to initiate the registration update after the response to the NAS request message is completed.

In some embodiments, the rejecting the NAS request message includes:

sending a rejection message for the NAS request message to the UE, where the rejection message includes a rejection reason, and the rejection reason indicates the TA abnormality.

In some embodiments, the rejection reason indicating the TA abnormality is configured to update the RA of the UE by triggering the UE to initiate the registration update.

In some embodiments, the apparatus further includes a stopping module configured to perform at least one of the following:

stopping the triggering of the registration update in response to determining that a registration update request from the UE is received in the process of triggering the RA update of the UE; or stopping the triggering of the registration update in response to determining that a time at which the RA update of the UE is triggered is an update time of a registration update cycle of the UE.

In some embodiments, the determining module 120 is configured to perform at least one of the following:

determining a response tolerance delay and/or a UE location accuracy requirement of the NAS request message according to the TA abnormality processing decision information; or determining the subsequent processing according to the response tolerance delay and/or the UE location accuracy requirement.

In some embodiments, the TA abnormality processing decision information includes at least one of the following:

device type information of the UE;

a service types related to the NAS request message;

a DNN related to the NAS request message;

network slice information related to the NAS request message;

network slice information contracted by the UE; or an operator operation strategy associated with the UE.

In some embodiments, the NAS request message includes at least one of the following:

a PDU session establishment request; or a service request.

Figure 12:
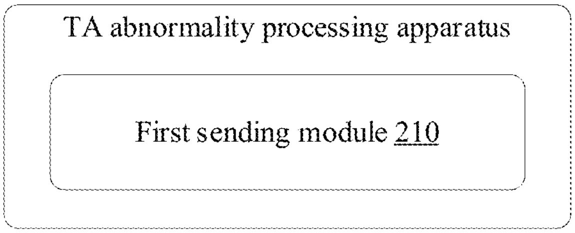
FIG. 12 is a schematic structural diagram of a TA abnormality processing apparatus according to an illustrative embodiment.

As shown in FIG. 12, an embodiment of the present disclosure provides a TA abnormality processing apparatus. The apparatus includes:

a first sending module 210, configured to send a registration update request based on triggering of a TA abnormality of the UE at a network side, where the registration update request is at least configured to update an RA of the UE.

In some embodiments, the first sending module 210 may be a program module. The program module can, after being executed by a processor, send a registration update request based on the triggering at the network side in the event of the TA abnormality of the UE.

In some embodiments, the first sending module 210 may be a module combining hardware and software. The module combing hardware and software includes, but is not limited to: various programmable arrays. The programmable arrays include, but are not limited to: field-programmable arrays and/or complex programmable arrays.

In some embodiments, the first sending module 210 may be a hardware-only module. The hardware-only module includes, but is not limited to: an application-specific integrated circuit.

The TA abnormality here includes: a TA where the UE is currently located being located outside the RA of the UE. In addition, the TA abnormality is determined by the network side.

In some embodiments, the apparatus further includes:

a second sending module, configured to send a NAS request message, where the NAS request message is configured to determine whether the UE has the TA abnormality.

In some embodiments, the apparatus further includes:

a second receiving module, configured to receive a rejection message for the NAS request message;

the rejection message contains a rejection reason indicating the TA abnormality, and the UE sends the registration update request.

In some embodiments, the apparatus further includes:

a third receiving module, configured to receive a triggering indication, where the triggering indication is configured to trigger the UE to send the registration update request, and is sent after the NAS request message is responded.

An embodiment of the present disclosure provides a communication device. The communication device includes:

a memory, configured to store an instruction executable by a processor; and the processor, connected to a memory;

the processor is configured to perform the TA abnormality processing method provided by any of the above technical solutions.

The processor may include various types of storage media. The storage media are non-transitory computer storage media that can continue to memorize information stored thereon after the communication device is powered off.

Here, the communication device includes: UE or a network device.

The processor may be connected to the memory through a bus or the like for reading an executable program stored on the memory, for example, the executable program corresponding to at least one of the methods shown in FIG. 2, and FIG. 5 to FIG. 10.

Figure 13:
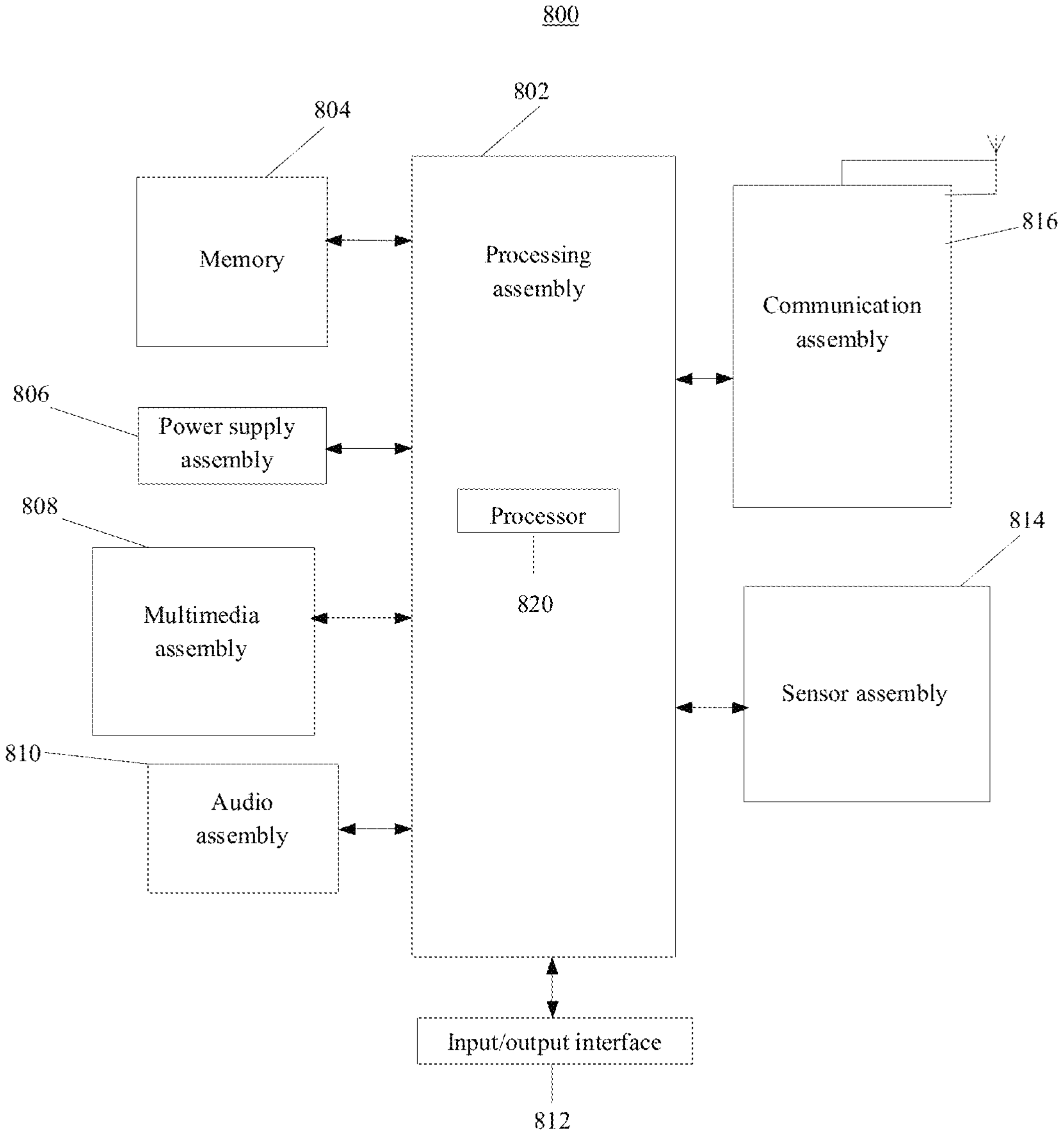
FIG. 13 is a schematic structural diagram of UE according to an illustrative embodiment.

FIG. 13 is a block diagram of UE 800 according to an illustrative embodiment. For example, the UE 800 may be a mobile phone, a computer, a digital broadcast user device, a message transceiving device, a game console, a tablet device, a medical device, a fitness device, a personal digital assistant, or the like.

Referring to FIG. 13, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the UE 800, such as operations associated with display, telephone calls, data communications, camera operations, and recording operations. The processing component 802 may include one or more processors 820 to execute instructions to complete all or part of the steps of the methods described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support the operations at the UE 800. Examples of such data include instructions for any application program or method operating on the UE 800, contact data, phonebook data, messages, pictures, videos, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power to various components of the UE 800. The power component 806 may include a power management system, one or more power sources, and other components associated with generating, managing, and distributing power for the UE 800.

The multimedia component 808 includes a screen that provides an output interface between the UE 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense boundaries of a touch or swipe action, but also detect the duration and pressure associated with the touch or swipe action. In some embodiments, the multimedia component 808 includes a front camera and/or a rear camera. The front camera and/or the rear camera may receive external multimedia data while the UE 800 is in an operation mode, such as a shooting mode or a video mode. Each of the front and rear cameras may be a fixed optical lens system or have focal length and optical zooming capabilities.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules. The peripheral interface modules may be keyboards, click wheels, buttons, or the like. The buttons may include, but not limited to: home buttons, volume buttons, start buttons, and lock buttons.

The sensor assembly 214 includes one or more sensors for providing the UE 800 with status assessment in various aspects. For example, the sensor component 814 may detect an open/closed status of the UE 800, relative positioning of components, such as the display and keypad of the UE 800. The sensor component 814 may also detect a change in position of the UE 800 or a component of the UE 800, the presence or absence of user contact with the UE 800, orientation or acceleration/deceleration of the UE 800, and a temperature change of the UE 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate wired or wireless communication between the UE 800 and other devices. The UE 800 can access a wireless network based on a communication standard, such as WiFi, 2G, or 3G, or a combination thereof. In one illustrative embodiment, the communication component 816 receives a broadcast signal or broadcast-associated information from an external broadcast management system via a broadcast channel. In an illustrative embodiment, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an illustrative embodiment, further provided is a non-temporary, computer-readable storage medium including instructions, such as the memory 804, including instructions executable by the processor 820 of the UE 800 to implement the above methods. For example, the non-temporary, computer-readable storage medium may be a ROM, a random access memory (RAM), a compact disc read-only memory (CD-ROM), a magnetic tape, a floppy disk, an optical data storage device, etc.

Figure 14:
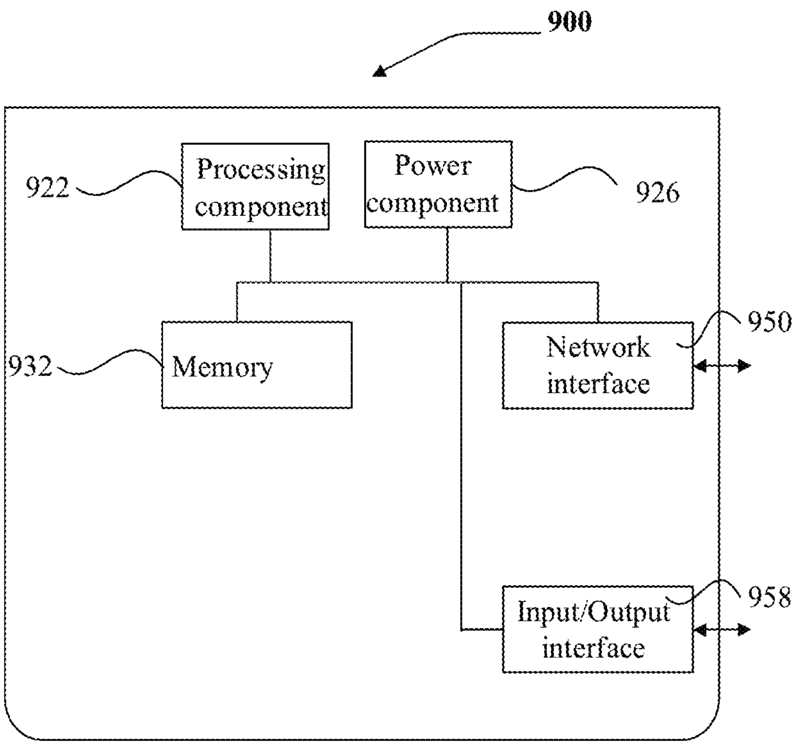
FIG. 14 is a schematic structural diagram of a network device according to an illustrative embodiment.

As shown in FIG. 14, an embodiment of the present disclosure shows a structure of an access device. For example, the network device 900 may be provided as a network-side device. The communication device may be the UE and/or network device described above.

Referring to FIG. 14, the network device 900 includes a processing component 922, which further includes one or more processors, and a memory resource represented by a memory 932 for storing instructions executable by the processing component 922, such as an application program. The application program stored in the memory 932 may include one or more modules, each corresponding to a set of instructions. In addition, the processing component 922 is configured to execute the instructions to perform any one of the above-described methods applied to the network device, for example, the methods shown in FIG. 2, and FIG. 5 to FIG. 10.

The network device 900 may further include a power component 926 configured to perform power management of the network device 900, a wired or wireless network interface 950 configured to connect the network device 900 to a network, and an input/output (I/O) interface 958. The network device 900 may operate based on an operating system stored in the memory 932, such as Windows Server™, Mac OS X™, Unix™, Linux™, FreeBSD™ or the like.

Those skilled in the art will readily recognize other embodiments of the present disclosure upon consideration of the specification and practice of the present disclosure disclosed herein. The present disclosure is intended to cover any variations, uses, or adaptations of the present disclosure, which follow the general principles of the present disclosure and include common knowledge or customary means in the art that are not disclosed in the present disclosure. The specification and embodiments are to be considered as illustrative merely, and the true scope and spirit of the present disclosure are indicated by the following claims.

It will be appreciated that the present disclosure is not limited to the exact construction that has been described above and illustrated in the accompanying drawings, and that various modifications and changes may be made without departing from the scope thereof. The scope of the present disclosure is merely limited by the appended claims.

In a first aspect, the example of the disclosure provides a Tracking Area (TA) abnormality processing method, which is performed by a network device, the method including:

receiving a Non-Access Stratum (NAS) request message; and determining subsequent processing according to TA abnormality processing decision information, in response to determining, according to the NAS request message, that a TA abnormality that a TA where a User Equipment (UE) is currently located is outside a Registration Area (RA) of the UE occurs.

In an embodiment, where the subsequent processing includes at least one of the following:

ignoring the TA abnormality, and responding to the NAS request message;

rejecting the NAS request message, and updating the RA by triggering the UE to initiate a registration update; or responding to the NAS request message, and updating the RA by triggering the UE to initiate the registration update after the response to the NAS request message is completed.

In an embodiment, the rejecting the NAS request message includes:

sending a rejection message for the NAS request message to the UE, where the rejection message includes a rejection reason; the rejection reason indicates the TA abnormality.

In an embodiment, the rejection reason indicating the TA abnormality is configured to update the RA of the UE by triggering the UE to initiate the registration update.

In an embodiment, the method further includes at least one of the following steps:

stopping the triggering of the registration update in response to determining that a registration update request from the UE is received in the process of triggering the RA update of the UE; or stopping the triggering of the registration update in response to determining that a time at which the RA update of the UE is triggered is an update time of a registration update cycle of the UE.

In an embodiment, where the determining the subsequent processing according to the TA abnormality processing decision information includes:

determining a response tolerance delay and/or a service delay requirement and/or a UE location accuracy requirement of the NAS request message according to the TA abnormality processing decision information; and determining the subsequent processing according to the response tolerance delay, and/or the service delay requirement, and/or the UE location accuracy requirement.

In an embodiment, where the TA abnormality processing decision information includes at least one of the following:

device type information of the UE;

a service type related to the NAS request message;

a data network name (DNN) related to the NAS request message;

network slice information related to the NAS request message;

network slice information contracted by the UE; or an operator operation strategy associated with the UE.

In an embodiment, where the NAS request message includes at least one of the following:

a protocol data unit (PDU) session establishment request message; or a service request message.

In a second aspect, the example of the disclosure provides a Tracking Area (TA) abnormality processing method, which is performed by a User Equipment (UE), the method including:

sending a registration update request based on triggering of a TA abnormality of the UE at a network side, where the registration update request is at least configured to update a Registration Area (RA) of the UE, where the TA abnormality includes: a TA where the UE is currently located being located outside the RA of the UE.

In an embodiment, including:

sending a Non-Access Stratum (NAS) request message, where the NAS request message, added with location information of the UE while passing through an access network device, is configured to determine whether the UE has the TA abnormality.

In an embodiment, further including:

receiving a rejection message for the NAS request message;

where the rejection message contains a rejection reason indicating the TA abnormality, and the UE sends the registration update request based on the rejection reason.

In an embodiment, further including:

receiving a triggering indication, where the triggering indication is configured to trigger the UE to send the registration update request, and is sent after the NAS request message is responded.

In a third aspect, the example of the disclosure provides a Tracking Area (TA) abnormality processing apparatus, including:

a first receiving module, configured to receive a Non-Access Stratum (NAS) request message; and a determining module, configured to determine subsequent processing according to TA abnormality processing decision information, in response to determining, according to the NAS request message, that a TA abnormality that a TA where a User Equipment (UE) is currently located is outside a Registration Area (RA) of the UE occurs.

In an embodiment, where the subsequent processing includes at least one of the following:

ignoring the TA abnormality, and responding to the NAS request message;

rejecting the NAS request message, and updating the RA by triggering the UE to initiate a registration update; or responding to the NAS request message, and updating the RA by triggering the UE to initiate the registration update after the response to the NAS request message is completed.

In an embodiment, where the rejecting the NAS request message includes:

sending a rejection message for the NAS request message to the UE, where the rejection message includes a rejection reason, and the rejection reason indicates the TA abnormality.

In an embodiment, the rejection reason indicating the TA abnormality is configured to update the RA of the UE by triggering the UE to initiate the registration update.

In an embodiment, further including a stopping module configured to perform at least one of the following:

stopping the triggering of the registration update in response to determining that a registration update request from the UE is received in the process of triggering the RA update of the UE; or stopping the triggering of the registration update in response to determining that a time at which the RA update of the UE is triggered is an update time of a registration update cycle of the UE.

In an embodiment, where the determining module is configured to perform at least one of the following:

determining a response tolerance delay and/or a UE location accuracy requirement of the NAS request message according to the TA abnormality processing decision information; or determining the subsequent processing according to the response tolerance delay and/or the UE location accuracy requirement.

In an embodiment, where the TA abnormality processing decision information includes at least one of the following:

device type information of the UE;

a service type related to the NAS request message;

a data network name (DNN) related to the NAS request message;

network slice information related to the NAS request message;

network slice information contracted by the UE; or an operator operation strategy associated with the UE.

In an embodiment, where the NAS request message includes at least one of the following:

a protocol data unit (PDU) session establishment request message; or a service request message.

In a fourth aspect, the example of the disclosure provides a Tracking Area (TA) abnormality processing apparatus, including:

a first sending module, configured to send a registration update request based on triggering of a TA abnormality of a UE at a network side, where the registration update request is at least configured to update a Registration Area (RA) of the UE, where the TA abnormality includes: a TA where the UE is currently located being located outside the RA of the UE.

In an embodiment, further including:

a second sending module, configured to send a NAS request message, where the NAS request message, added with location information of the UE while passing through an access network device, is configured to determine whether the UE has the TA abnormality.

In an embodiment, further including:

a second receiving module, configured to receive a rejection message for the NAS request message;

the rejection message contains a rejection reason indicating the TA abnormality, and the UE sends the registration update request based on the rejection reason.

In an embodiment, further including:

a third receiving module, configured to receive a triggering indication, where the triggering indication is configured to trigger the UE to send the registration update request, and is sent after the NAS request message is responded.

In a fifth aspect, the example of the disclosure provides a communication device. The communication device includes a processor, a transceiver, a memory, and an executable program stored on the memory and operable on the processor. The processor, when executing the executable program, performs the TA abnormality processing method provided by the first aspect or the second aspect.

In a sixth aspect, the example of the disclosure provides a computer storage medium, and the computer storage medium stores an executable program; the executable program can, after being executed by a processor, implement the TA abnormality processing method provided by the first aspect or the second aspect.

In the technical solutions provided by the embodiments of the present disclosure, after the TA abnormality is found based on the NAS request message sent by the UE, subsequent processing steps suitable for the current situation are determined according to the TA abnormality decision information, which can ensure a timely response to the NAS request message when the timely response to the NAS request message is needed, and can timely eliminate the TA abnormality when the TA abnormality is needed to be timely eliminated.

The invention claimed is:

1. A Tracking Area (TA) abnormality processing method, which is performed by a network device, the method comprising:

receiving a Non-Access Stratum (NAS) request message; and determining subsequent processing according to TA abnormality processing decision information, in response to determining, according to the NAS request message, that a TA abnormality that a TA where a User Equipment (UE) is currently located is outside a Registration Area (RA) of the UE occurs, wherein the determining the subsequent processing according to the TA abnormality processing decision information comprises:

determining at least one of a response tolerance delay, a service delay requirement, or a UE location accuracy requirement of the NAS request message according to the TA abnormality processing decision information; and determining the subsequent processing according to at least one of the response tolerance delay, the service delay requirement, or the UE location accuracy requirement, wherein determining the subsequent processing according to at least one of the response tolerance delay, the service delay requirement, or the UE location accuracy requirement comprises:

in response to determining that a second condition is satisfied, ignoring the TA abnormality, and responding to the NAS request message; or responding to the NAS request message, and updating the RA by triggering the UE to initiate a registration update after a response to the NAS request message is completed; or in response to determining that the second condition is not satisfied, rejecting the NAS request message, and updating the RA by triggering the UE to initiate a registration update, wherein the second condition being satisfied comprises at least one of:

the response to the NAS request message not involving location information of the UE; or the response to the NAS request message involving the location information of the UE, but an accuracy requirement for the location information of the UE is lower than a preset accuracy.

2. The method according to claim 1, wherein the rejecting the NAS request message comprises:

sending a rejection message for the NAS request message to the UE, wherein the rejection message comprises a rejection reason, wherein the rejection reason indicating the TA abnormality is configured to update the RA of the UE by triggering the UE to initiate the registration update.

3. The method according to claim 2, wherein the rejection reason indicates the TA abnormality.

4. The method according to claim 1, wherein the method further comprises at least one of the following steps:

stopping the triggering of the registration update in response to determining that a registration update request from the UE is received in the process of triggering the RA update of the UE; or stopping the triggering of the registration update in response to determining that a time at which the RA update of the UE is triggered is an update time of a registration update cycle of the UE.

5. The method according to claim 1, wherein the TA abnormality processing decision information comprises at least one of the following:

device type information of the UE;

a service type related to the NAS request message;

a data network name (DNN) related to the NAS request message;

network slice information related to the NAS request message;

network slice information contracted by the UE; or an operator operation strategy associated with the UE.

6. The method according to claim 1, wherein the NAS request message comprises at least one of the following:

a protocol data unit (PDU) session establishment request message; or a service request message.

7. The method according to claim 1, wherein determining the subsequent processing according to at least one of the response tolerance delay, the service delay requirement, or the UE location accuracy requirement further comprises:

in response to determining that a first condition is satisfied and a time interval between a time at which the TA abnormality is determined and a next update time of a periodic registration update of the UE is less than a preset threshold, ignoring the TA abnormality, and responding to the NAS request message;

in response to determining that the first condition is satisfied and the time interval is not less than the preset threshold, responding to the NAS request message, and updating the RA by triggering the UE to initiate the registration update after the response to the NAS request message is completed; and in response to determining that the first condition is not satisfied, rejecting the NAS request message, and updating the RA by triggering the UE to initiate the registration update, wherein the first condition being satisfied comprises at least one of:

the response tolerance delay being less than a preset duration threshold;

the response tolerance delay being less than a duration required for a registration update process of the UE;

a service delay corresponding to the service delay requirement being less than the preset duration threshold; or the service delay corresponding to the service delay requirement being less than the duration required for the registration update process of the UE.

8. A non-transitory computer storage medium, storing an executable program; when executed by a processor, the executable program causes the processor to implement the method according to claim 1.

9. A communication device, comprising one or more processors, a transceiver, a memory, and an executable program stored on the memory and runnable by the one or more processors, wherein the one or more processors are collectively configured to:

receive a Non-Access Stratum (NAS) request message; and determine subsequent processing according to TA abnormality processing decision information, in response to determining, according to the NAS request message, that a TA abnormality that a TA where a User Equipment (UE) is currently located is outside a Registration Area (RA) of the UE occurs, wherein the one or more processors are further collectively configured to:

determine at least one of a response tolerance delay, a service delay requirement, or a UE location accuracy requirement of the NAS request message according to the TA abnormality processing decision information; and determine the subsequent processing according to at least one of the response tolerance delay, the service delay requirement, or the UE location accuracy requirement, wherein the one or more processors are further collectively configured to:

in response to determining that a second condition is satisfied, ignore the TA abnormality, and respond to the NAS request message; or respond to the NAS request message, and update the RA by triggering the UE to initiate a registration update after a response to the NAS request message is completed; or in response to determining that the second condition is not satisfied, reject the NAS request message, and update the RA by triggering the UE to initiate a registration update, wherein the second condition being satisfied comprises at least one of:

the response to the NAS request message not involving location information of the UE; or the response to the NAS request message involving the location information of the UE, but an accuracy requirement for the location information of the UE is lower than a preset accuracy.

10. The communication device according to claim 9, wherein the one or more processors are further collectively configured to perform at least one of the following:

stop the triggering of the registration update in response to determining that a registration update request from the UE is received in the process of triggering the RA update of the UE, or stop the triggering of the registration update in response to determining that a time at which the RA update of the UE is triggered is an update time of a registration update cycle of the UE.

11. The communication device according to claim 9, wherein the one or more processors are further collectively configured to:

in response to determining that a first condition is satisfied and a time interval between a time at which the TA abnormality is determined and a next update time of a periodic registration update of the UE is less than a preset threshold, ignore the TA abnormality, and respond to the NAS request message;

in response to determining that the first condition is satisfied and the time interval is not less than the preset threshold, respond to the NAS request message, and update the RA by triggering the UE to initiate the registration update after the response to the NAS request message is completed; and in response to determining that the first condition is not satisfied, reject the NAS request message, and update the RA by triggering the UE to initiate the registration update, wherein the first condition being satisfied comprises at least one of:

the response tolerance delay being less than a preset duration threshold;

the response tolerance delay being less than a duration required for a registration update process of the UE;

a service delay corresponding to the service delay requirement being less than the preset duration threshold; or the service delay corresponding to the service delay requirement being less than the duration required for the registration update process of the UE.

12. A Tracking Area (TA) abnormality processing method, which is performed by a User Equipment (UE), the method comprising:

sending a registration update request based on triggering of a TA abnormality of the UE at a network side, wherein the registration update request is at least configured to update a Registration Area (RA) of the UE, wherein the TA abnormality comprises: a TA where the UE is currently located being located outside the RA of the UE, wherein the method further comprises:

sending a Non-Access Stratum (NAS) request message; wherein the NAS request message, added with location information of the UE while passing through an access network device, is configured to determine whether the UE has the TA abnormality, wherein at least one of a response tolerance delay, a service delay requirement, or a UE location accuracy requirement of the NAS request message is configured to be used by the network side to determine subsequent processing when the TA abnormality occurs, wherein the subsequent processing determined according to at least one of the response tolerance delay, the service delay requirement, or the UE location accuracy requirement comprises:

in response to determining that a second condition is satisfied, ignoring the TA abnormality, and responding to the NAS request message; or responding to the NAS request message, and updating the RA by triggering the UE to initiate a registration update after a response to the NAS request message is completed; or in response to determining that the second condition is not satisfied, rejecting the NAS request message, and updating the RA by triggering the UE to initiate a registration update, wherein the second condition being satisfied comprises at least one of:

the response to the NAS request message not involving location information of the UE; or the response to the NAS request message involving the location information of the UE, but an accuracy requirement for the location information of the UE is lower than a preset accuracy.

13. The method according to claim 12, further comprising:

receiving a rejection message for the NAS request message;

wherein the rejection message contains a rejection reason indicating the TA abnormality, and the UE sends the registration update request based on the rejection reason.

14. The method according to claim 12, further comprising:

receiving a triggering indication, wherein the triggering indication is configured to trigger the UE to send the registration update request, and is sent after the NAS request message is responded.

15. A communication device, comprising one or more processors, a transceiver, a memory, and an executable program stored on the memory and runnable by the processor, wherein the one or more processors are collectively configured to perform the method according to claim 12 when executing the executable program.

16. A non-transitory computer storage medium, storing an executable program; when executed by a processor, the executable program causes the processor to implement the method according to claim 12.

* * * * *